United States Patent [19]

Gerstein et al.

[11] Patent Number: 4,600,239
[45] Date of Patent: Jul. 15, 1986

[54] VEHICULAR SEAT FOR HANDICAPPED AND ELDERLY PERSONS

[75] Inventors: Milton S. Gerstein, Chicago, Ill.; Rosemarie R. Kraft, 4627 S. Talman Ave., Chicago, Ill. 60632

[73] Assignee: Rosemarie R. Kraft, Chicago, Ill.

[21] Appl. No.: 730,494

[22] Filed: May 6, 1985

[51] Int. Cl.$^4$ ............................ B60N 1/04; A61G 5/00
[52] U.S. Cl. ..................................... 297/349; 5/81 B; 248/425; 296/65 R; 297/330; 297/433
[58] Field of Search ............... 297/330, 346, 349, 433, 297/434; 248/425; 5/81 B, 81 R; 296/65 R

[56] References Cited

U.S. PATENT DOCUMENTS

| | | | |
|---|---|---|---|
| 507,921 | 10/1893 | O'Brien | 297/433 X |
| 1,106,017 | 8/1914 | Wendelken | 108/143 |
| 1,902,282 | 3/1933 | Hultgren | 248/425 |
| 2,266,200 | 12/1941 | Hedley | 297/349 X |
| 2,290,464 | 7/1942 | Buchheit | 297/349 X |
| 3,051,552 | 8/1962 | Myers | |
| 3,066,979 | 12/1962 | Pitts et al. | |
| 3,191,400 | 6/1965 | Swenson | |
| 3,236,556 | 2/1966 | Lathers | |
| 3,253,856 | 5/1966 | Ueda | |
| 3,572,817 | 3/1971 | Colautti et al. | |
| 3,659,895 | 5/1972 | Dredson | |
| 3,910,432 | 10/1975 | Browne et al. | |
| 3,974,051 | 8/1976 | Ballagh | 297/434 |
| 4,008,500 | 2/1977 | Hall, Jr. | 297/349 X |
| 4,059,171 | 11/1977 | Pakosh | 297/349 X |
| 4,155,587 | 5/1979 | Mitchell | 297/346 X |
| 4,241,893 | 12/1980 | Koutsky et al. | 248/425 |

FOREIGN PATENT DOCUMENTS 2483222 12/1981 France ........................... 5/81 B
3687 of 1883 United Kingdom .............. 297/434

Primary Examiner—William E. Lyddane
Assistant Examiner—Peter R. Brown
Attorney, Agent, or Firm—Marvin N. Benn; Milton S. Gerstein

[57] ABSTRACT

A vehicular seat for handicapped and elderly persons is disclosed which is readily accommodated in any type of conventional vehicle, such as automobile, van, bus and the like. The vehicular seat is given three degrees of freedom of movement, the first degree being a rotary one in a horizontal plane about a shiftable vertical axis of rotation, the second being a rectilinear one in a horizontal plane, and the third being rotary in a horizontal plane about a fixed vertical rotary axis. The three degrees of freedom allow for angular positioning of the seat proper relative to the ajar door, so as to ensure minimal interference between the person being seated and the frame and ajar door of the vehicle. The seat proper is provided with a pair of leg rests, each being independently maneuverable and locked in place by a manually-rotatable lever detent which has a lower end having an arcuate cut-out portion for receiving therein one detent rod of a plurality of parallel detent rods, each rod spanning the width of the rear surface of the leg rest to position each leg rest at a desired pivotal orientation.

9 Claims, 14 Drawing Figures

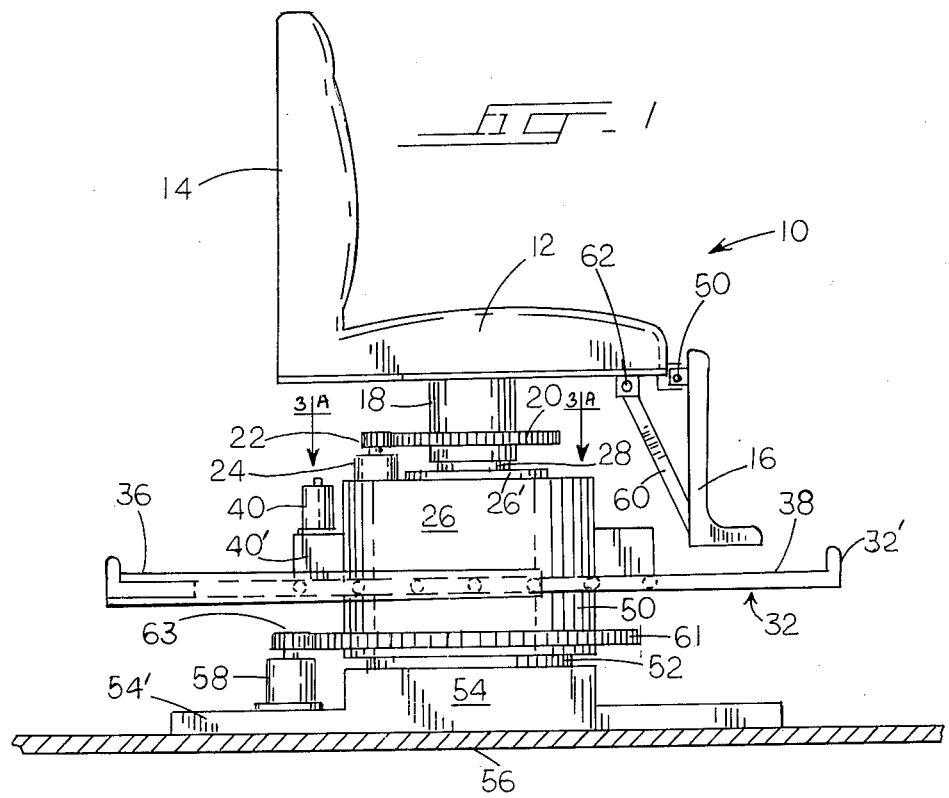
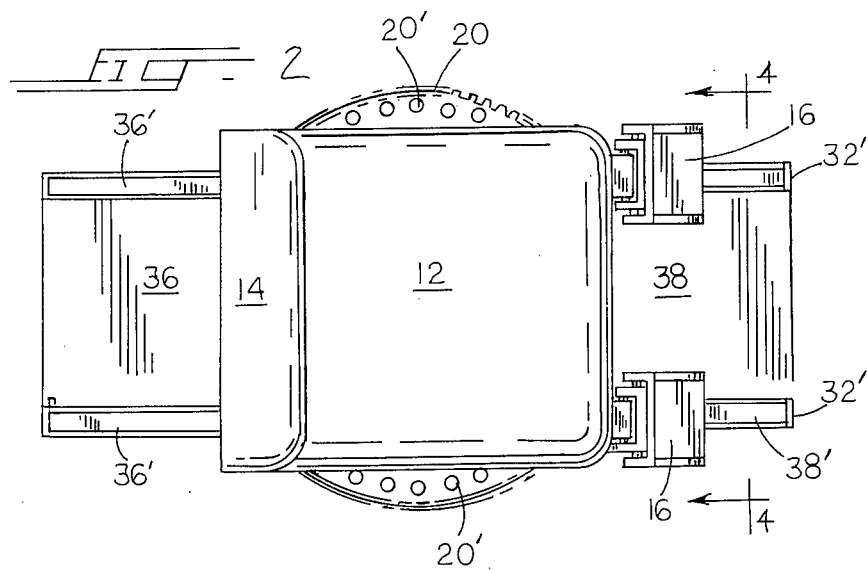

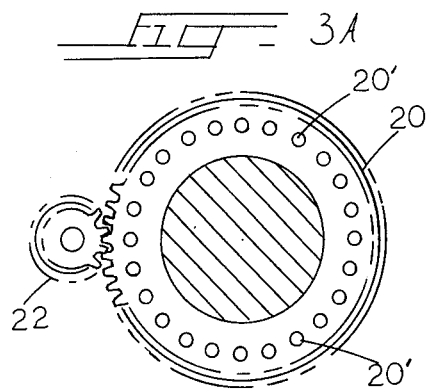
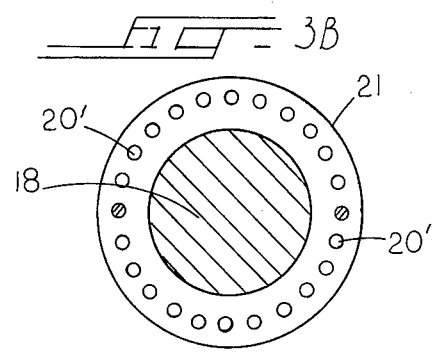
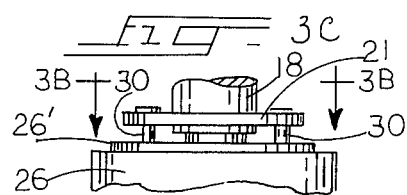
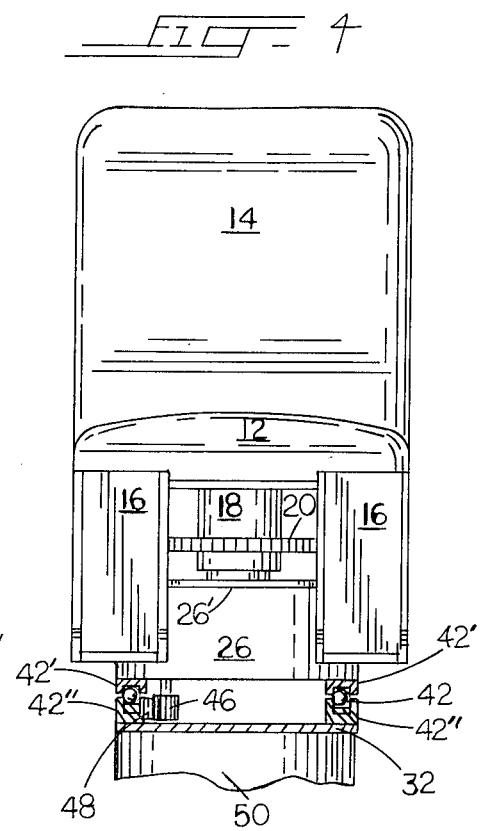
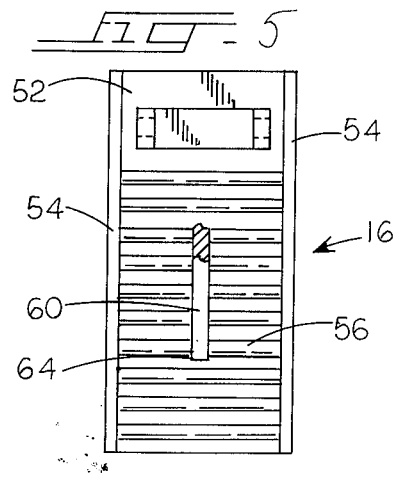
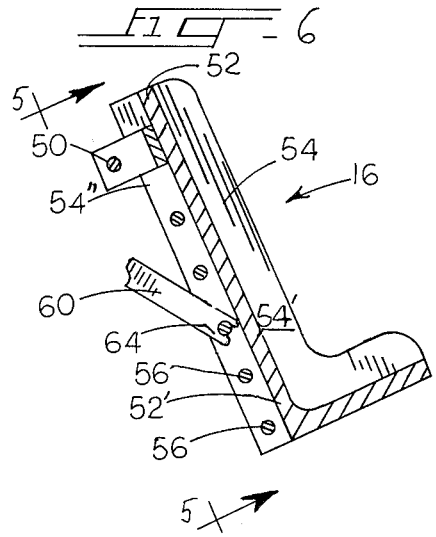

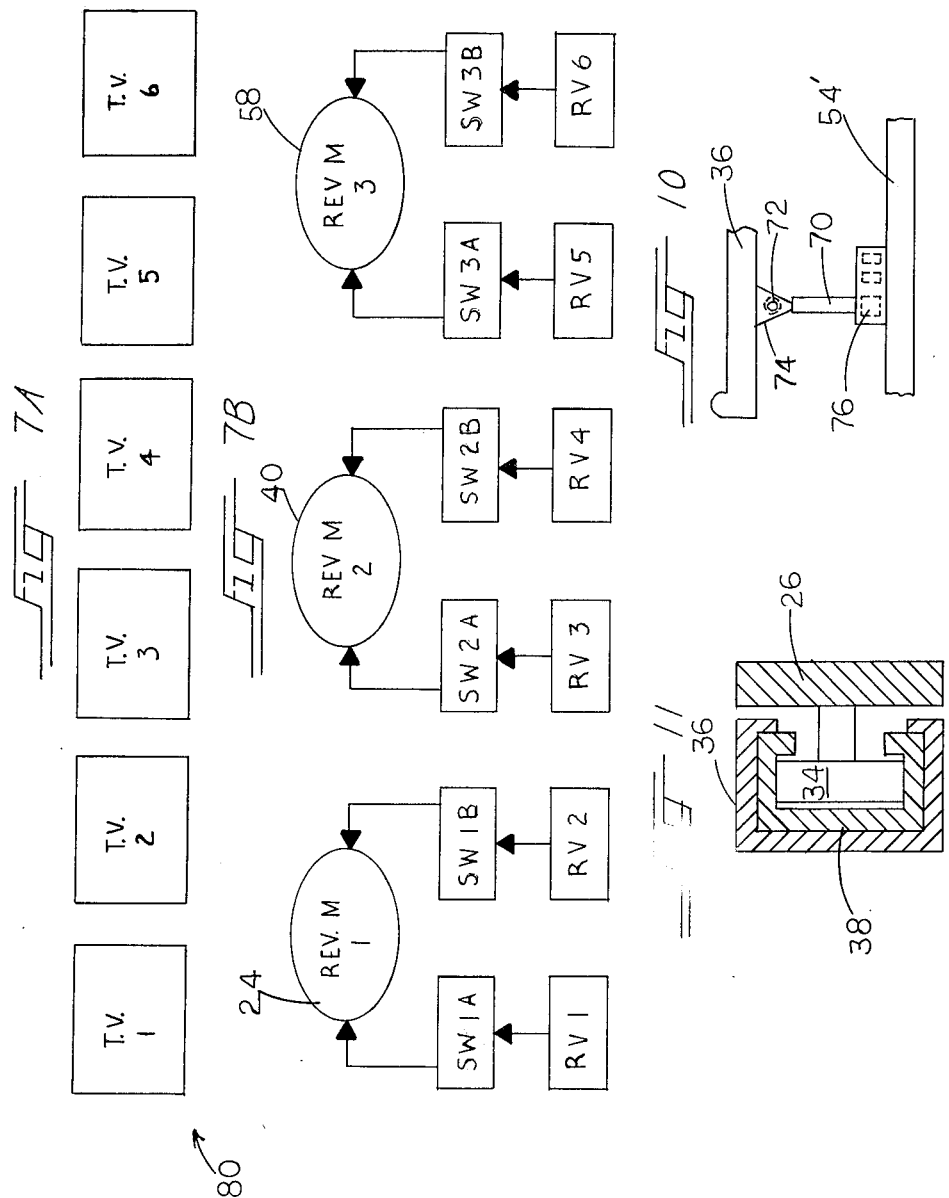

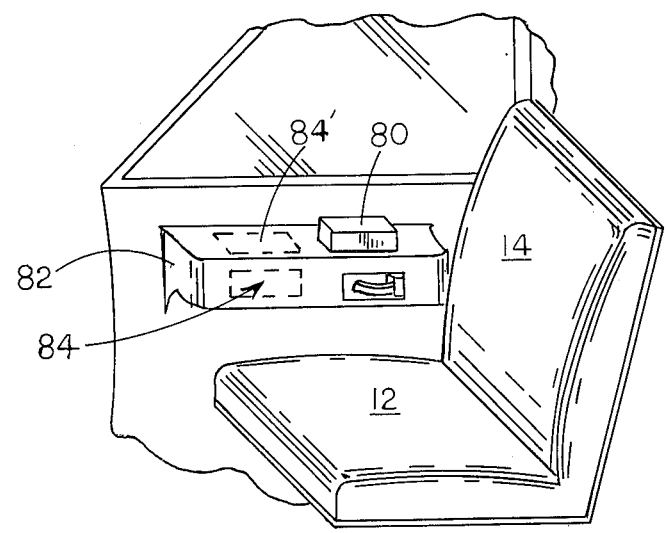
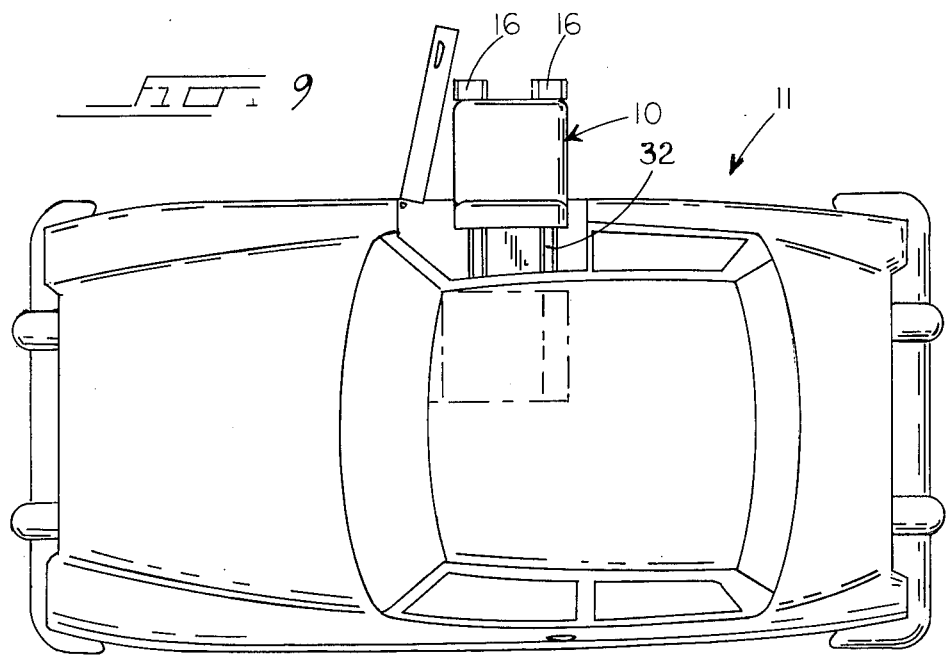

VEHICULAR SEAT FOR HANDICAPPED AND ELDERLY PERSONS

BACKGROUND OF THE INVENTION

The present invention is directed to a seat for a vehicle, such as an automobile, van, bus, and the like, which allows for easy and safe seating of an elderly or handicapped person, and easy and safe alightment from the seat.

Presently-used vehicular seats, such as the conventional car passenger seat in the automobile, is not well-equipped to accomodate persons for whom there is considerable difficulty in seating himself or herself on the seat and getting up from the seat when exiting from the vehicle. So-called swivel seats have been known for a long time, but these typically consist of a simple vehicular seat that pivots about a vertical axis, which vertical axis may or may not be eccentrically positioned relative to the mid-plane of the seat taken from front-to-rear of the vehicle. This swivelling of the seat allows easier egress from the vehicle, since the seat faces toward the doorway of the vehicle. In some instances, especially in an offset-pivot axis, such pivotal movement toward the door would permit the seated person to implant his or her feet directly on the ground after the seat has been pivoted to face toward the door.

However, these swivel seats are not meant for use by handicapped and elderly persons, but simply to serve to help one into and out of the vehicle in a faster and easier manner.

There are vehicular seats expressly made for handicapped persons, but such prior art seats are cumbersome, difficult to operate, and are usually unsightly and appear specially-made for a handicapped person. Typically, such prior art seats for handicapped persons employ heavy lifting equipment that is not only costly, but difficult to maintain, which is limited in the type of vehicle in which it can be utilized. Owing to their size and weight, a large-sized van or bus is the only vehicle that can be considered for the deployment of these prior art seats. The use of such seats in passenger cars is impossible. Further, their use in vans and buses serves to limit the available space for other passengers, while their manner of operation requires special vehicle-frame entrance openings to accomodate their size and operation.

SUMMARY OF THE INVENTION

It is, therefore, the primary object of the present invention to provide a vehicular seat for handicapped and elderly persons that is capable of being accomodated in any conventional vehicle, such as a passenger car, bus, van, and the like, without any alteration-requirements of the vehicle frame itself.

It is another object of the present invention to provide a vehicular seat for handicapped and elderly persons that is simple to use and operate, and which has the same basic configuration regardless of which type of vehicle in which it is to be employed.

It is yet another object of the present invention to provide a vehicular seat for handicapped and elderly persons that permits simple egress from and entry into the vehicle.

It is still another objective of the present invention to allow for such vehicular seat to be remotely controlled by either the driver of the vehicle, or the passenger or passengers.

It is still another object of the present invention to provide such a vehicular seat so that it can readily and simply accomodate an elderly or handicapped person of any size and weight by allowing the seat to be oriented, relative to the doorway of the vehicle with which it is associated, in many chosen positions taken in an imaginary horizontal plane, and also relative to the fixed imaginary vertical plane containing the doorway of the vehicle.

Toward these and other ends, the vehicular seat for handicapped and elderly persons of the present invention is made up of a seat that is given three degrees of freedom of movement: The first degree of freedom of movement is rotary and lies in a horizontal plane about a first horizontally-shiftable vertical axis; the second degree is rectilinear and in a horizontal plane; and the third degree of freedom is also rotary, in a horizontal plane about a vertical axis fixed in space. These three degrees of freedom of movement allow for the positioning of the seat outside of the door of the vehicle, such that the seat proper projects outwardly through the doorway of the vehicle at any desired angle relative thereto in order to facilitate the seating of the person thereon, the particular angular relationship of the seat proper being the one so chosen so as to provide the minimal interference with the frame of the vehicle and the ajar vehicle-door.

The first degree of freedom of movement is provided by bearings mounting a pedestal portion of the seat projecting downwardly toward the floor of the vehicle, which pedestal portion is rotated by a reversible motor and gear arrangement, which motor is mounted upon a carriage that provides the reciprocable rectilinear second degree of freedom of movement. The carriage is reciprocable along a track by rollers on the underside of the carriage, which rollers are powered by a second suitable reversible motor and gear arrangement provided with the carriage. The track itself is mounted on ball bearings to provide the third degree of freedom of movement and is powered by a third reversible motor. To ensure structural integrity of the seat upon its outward-extension along the track, the rearward portion of the track is buttressed by a cam and lever arrangement, which includes a lever arm having a first end pivoted to the underside of the track at the rear end thereof, and a second end having a roller-follower thereon that rides along an arcuate channel member, which arcuate channel member has the same radius of curvature as the portion of the track to which the first end of the lever arm is pivotally connected, so that when the track and seat are rotated in the third degree of freedom of movement, the roller-follower rides along the channel member and is held therein, so as to counteract any movements created by the seating of a person on the seat proper as it is projected out the vehicular doorway.

The seat proper is provided with a pair of pivotal leg rests, each preferably being independently maneuverable. In the preferred form of the invention, each leg rest is provided with a plurality of detent rods, which cooperate with a detent lever pivotally connected at its upper end to the underside of the seat proper, with its lower end being formed with a horse-shoe shaped cut-out portion for insertion therein of one of the plurality of detent rods, to thereby hold the respective leg rest in a desired pivoted orientation relative to the seat proper. Each leg rest is also preferably provided with side retaining walls that prevent the accidental falling off of the leg.

In a modified form of the invention, the seat proper is manually rotatable in its first degree of freedom of movement about the shiftable vertical axis. In this embodiment, an annular plate with circumferentially-arranged holes is provided about a lower portion of the downwardly-extending pedestal portion of the seat proper. The upper portion of the means forming the bearings for the pedestal portion of the seat proper is provided with a similar circumferentially-arranged series of holes, so that the two series of holes are capable of being aligned, so that a locking pin may be inserted through a hole of the first series and into an aligned hole of the second series therebelow, to thereby lock in place the seat proper, in order to prevent further rotation thereof in the first horizontal plane.

The seat of the present invention is also provided with remote control means for remotely controlling the operation of the seat while a person is still in the vehicle or is outside the vehicle. This remote control means includes a transmitter having a pair of separately-tuned transmitter circuits for each reversible motor of the seat, one of the pair for movement of a motor in one direction, and the other of the pair for movement of a motor in the other direction. Each motor has associated therewith a pair of receiver units that correspond to the pair of transmitter units, and a pair of switching elements for each pair of receiver units. The remote control transmitter unit is compact and readily insertable into a compartment on the vehicle dashboard, or on the console of the vehicle, or on the interior of the adjacent door itself.

BRIEF DESCRIPTION OF THE DRAWING

The invention will be more readily understood with reference to the accompanying drawing, wherein:

FIG. 1 is a side, elevational view showing the vehicular seat for handicapped and elderly persons of the present invention;

FIG. 2 is a top plan view of the seat of FIG. 1;

FIG. 3A is a sectional view taken along line 3A—3A of FIG. 1;

FIG. 3B is a detail view showing the seat locking plate that is manually operable;

FIG. 4 is a side veiw showing another embodiment for mounting the carriage of the seat of the invention for reciprocal movement;

FIG. 5 is a rear view taken along line 5—5 of FIG. 6;

FIG. 6 is a partial cross-sectional side elevational view of the pivotal leg rest support of the present invention;

FIG. 7A is a schematic showing the remote-control transmitter units for remotely-controlling the operation of the seat of the present invention;

FIG. 7B is a schematic showing the receiver units operated by the transmitter units of FIG. 7A which control the operation of the motors of the seat of the present invention;

FIG. 8 is a pictorial view showing the transmitter unit of the present invention located on the arm rest of a car door for storage and use next to the seat of the present invention;

FIG. 9 is a top plan view showing a car incorporating therein the novel seat of the present invention, which seat is shown projecting outwardly of the open doorway for subsequent seating thereon by a handicapped or elderly person;

FIG. 10 is a detail view showing the rear portion of the track assembly of the seat of the present invention with a buttressing truss extending from the underside thereof and therebelow to a channel in which it moves for providing additional support to the track assembly during seating of a person; and FIG. 11 is a detailed sectional view of a portion of the track assembly of the seat of the present invention showing one of the rollers of the carriage for the seat of the invention riding therein, so as to allow reciprocation of the seat forwardly and rearwardly to any desired position.

DETAILED DESCRIPTION OF THE INVENTION

Referring now to the drawing in greater detail, the vehicular seat for handicapped and elderly persons of the invention is indicated generally by reference numeral 10 in FIG. 1. This seat may be used in an automobile, as shown, for example, in FIG. 9, or may be used in vans, trucks and buses, with the same general contruction applicable for each vehicle in which it is mounted. The seat 10 is provided with a seat proper having a lower cushion portion 12 and a rear back support portion 14. At the forward part of the cushion portion 12, attached to its structural frame, is a pair of leg rests 16, to be described in detail below. The seat 10 is mounted for three separate and independent movements so that the seat proper 12 and 14 may be projected outwardly of the door opening of the vehicle, so as to enable an elderly or handicapped person to easily seat himself thereon. Such three independent movements allow for the desired and best angular positioning of the seat proper relative to the ajar door of the vehicular, so as to ensure as few obstacles to such seating as possible. The first independent movement of the seat proper is rotary, occurring about a vertical axis. The lower framework of the cushion seat portion 12 is provided with a downwardly extending, centrally-located pedestal 18 about which is provided a concentric ring gear 20 driven by spur gear 22, which in turn is rotated via a reversible motor 24 mounted on the upper surface of a carriage mount 26. The carriage 26 is provided with an upstanding pivot post 28 that is provided with bearings, in the conventional manner, for rotatably supporting the pedestal portion 18 for rotation thereabout.

The annular ring gear 20 also includes a series of circumferentially-arranged holes 20', as shown in FIG. 3A. The upper surface of the carriage mount 26 is provided, also, with a projecting surface 26' that includes a series of circumferentially-arranged holes of the same diametric extension as the series 20', so that the holes 20' and holes of the upper portion 26' may be aligned one above the other. This alignment allows for the insertion through aligned holes of detent pins 30, such as those shown in FIG. 3C. These detent pins may be used when the seat is in its normal, within-the-vehicle state, so as to prevent any accidental movement of the seat proper when the handicapped or elderly person is emplaced thereon. As an alternative to the motorized rotation of the seat proper, a simple annular plate 21 may be used instead, with the same series of circumferentially-arranged holes 20' used, as shown in FIGS. 3B and 3C. The detent pins 30, in this embodiment, thus serve as the only means by which the seat proper is held in a non-rotatable condition about the pivot post 28. To rotate the seat proper, the detent pins are removed, with the seat proper rotated manually to its desired position, at which point the person to be seated may be placed on the seat, after which the seat is rotated back to its normal position with the detent pins re-inserted through respective aligned holes in the plate 21 and upper surface 26'. Whether the seat proper is rotated manually or by a motor, a first degree of freedom of movement is thus established. The diameter of the annular ring 20 of plate 21 is great enough so as to allow for portions thereof to project beyond the side edges of the lower seat portion 12, as shown in FIG. 2, so that the detent pins may be accessed and inserted.

The carriage 26 is mounted for reciprocal movement along a track 32 in order to position the seat proper in a desired horizontal location with respect to the windshield of the vehicle, or the like. The track and carriage arrangement allows for the seat proper to be positioned in any adjusted position depending upon the size and height of the person sitting thereon, as is the standard practice in all vehicular seats. However, the track also allows for such positioning of the seat proper such that it projects outwardly of the doorway of the vehicle, so as to allow easy and safe seating when the track-and-carriage assembly is rotated by a structure to be described below. The underside of the carriage 26 rotatably mounts a plurality of rollers 34, on either side thereof. The track 32 is made up of a pair of telescoping elements 36 and 38, with the element 38 being slidable within the element 36 and projectable therefrom, as shown in FIG. 1. This telescoping arrangement allows for the length of track on which the carriage rides to be adjusted to suit the particular vehicle in which the seat is mounted, and also to preset the outward-most movement of the seat which occurs upon abutment against stops 32'. Each track element 36 and 38 has side edges that are essentially C-shaped channel members 36' and 38', as shown in FIG. 11, with the rollers 34 riding in channel members 38'. The track elements 36 and 38 are secured at any desired relative position by any conventional securing means, such as bolts having large-sized handle portions for easy rotation thereby. The track element 38 preferably has a groove for receiving the ends of the bolts to hold the track elements in their relative states. The grooves also preferably have a series of spaced and threaded openings in which the end of the screws may be secured, to ensure safe and fast securement. The track element 36 also has appropriately-placed slots. It is also possible to provide the carriage 26 with a series of rollers each having a length extending substantially across the entire width of the track elements 36 and 38, with the ends of each roller riding in the oppositely disposed C-shaped channel members 38'. To drive the carriage along the track, a second reversible motor 40 is provided on the ear 40' of the carriage, adjacent the first motor 24. The motor 40 is operatively connected to preferably two of the rollers 34 for driving the carriage along the track, by any conventional means, such as belt and pulley or gearing, such not being shown since it is well-known and conventional. The track 32 thus provides a second degree of freedom of movement to the seat proper in a horizontal plane perpendicular to the vertical axis of the pivot post 28.

In FIG. 4, an alternative embodiment for reciprocating the carriage on the track is shown. In this embodiment, the carriage 26 is connected to the track by ball bearings 42, with the bottom of the carriage being formed with inverted, side U-shaped channels 42' that cooperate with the side U-shaped channels 42" of the track, so as to encompass the ball bearings therebetween. A pinion gear 46, for example, meshing with a rack gear 48 on the inner side portion of a channel member 42", provides the locomotive connection with the motor 40, as clearly shown in FIG. 4.

The track assembly 32 is itself mounted for rotation on pivot shaft 52 by ball bearings (not shown), which pivot shaft 52 extends vertically upwardly from a base support 54 suitably fastened to the floor 56 of the vehicle. A reversible motor 58, supported on side ear 54', rotates the track assembly, and, therefore, the carriage 26 and seat proper connected to the track assembly, via ring gear 60 and spur gear 62. Thus, the third degree of freedom of movement for the seat proper is provided. As shown in FIG. 1, the pivot post 28 and the pivot shaft 52 are in axial alignment for normal positioning of the seat proper. However, when the seat proper is extended along the track assembly, the pivot post 28 becomes offset from the pivot shaft 52, so that, upon rotation of the track assembly via reversible motor 58, the seat proper is given an eccentric rotation, which aids in the projection of the seat proper beyond the door opening in a faster and easier manner. Depending upon the vehicle in which the seat is to be used, and the size of the person being seated, the three motors 24, 40, and 58 can be controlled to position and project the seat proper outside the door entrance in the most efficient and easiest manner possible. The seat proper 12 and 14 may be so initially set, that only the motor 58 need be operated to extend the seat out the door opening. This can be accomplished by initially operating the motor 24 to place the detent pins in the appropriately aligned holes to orient the seat proper relative to the position the door will take when it is ajar, and operating the motor 40 to position the carriage 26 along the track assembly 32 at that location that will allow projection of the door beyond the door opening but still provide clearance thereof when the track assembly is rotated by the motor 58. This initial positioning of the seat proper by the motor 40 (or the plate 21 in the manual operation thereof shown in the embodiment of FIG. 3B) may also be so chosen as to ensure that the rotation of the track assembly is made easier and that the seat proper may project even a greater distance. Thus, for example, by initially rotating the seat proper counterclockwise about the pivot post 28, when viewing FIG. 1, about 15 degrees, not only will the seat proper project outwardly more, since the seat proper may be located more forwardly along the track assembly, but also the seat proper will be extending approximately at the angle of the ajar door when the seat is projecting outwardly, so that the door will not obstruct seating of the person in the seat. Of course, any set of maneuvers may be employed to project the seat proper out the doorway, each maneuver depending upon the type and size of vehicle in which the seat is employed, along with the state and size of the person being seated. As will be described below in greater detail, the motors of the seat may be controlled remotely so that all of the maneuvers required of the seat may be accomplished while sitting in the vehicle, or while standing adjacent the ajar door.

Each of the leg rest supports 16 is independently adjustable relative to the front portion of the cushion seat portion 12. A pivot pin 50 pivotally connects the upper end of each leg rest support 16 to a respective side of the frame of the seat portion 12, as clearly shown in FIG. 1. Each leg rest support 16 includes a rigid plate member 52, as shown in FIGS. 5 and 6. The plate member 52 is nestled between a pair of side retaining walls 54, which retaining walls prevent the accidental falling off of the leg from the support 16. Each retaining wall 54 projects forwardly and rearwardly of the rigid plate, so as to define forward portions 54' and rearward portions 54'', the forward portions serving the function of retaining the legs on the rigid plate, while the rearward portions serving to mount therebetween a plurality of detent rods 56. Each detent rod 56 extends between the two rearward portions of the pair of side retaining walls 54, are parallel to one another, and define gaps therebetween, as can be seen clearly in FIG. 6. The detent rods cooperate with a pivotal detent lever 60 shown in FIGS. 1, 5, and 6, which pivotal lever 60 has a first end pivoted to the underside of the forward portion of the seat portion 60 via pivot pin 62, and a second end formed with a bifurcated tip 64 arcuately shaped to receive therein one of the plurality of detent rods 56. It can, therefore, be seen that each leg rest support 16 may be independently oriented relative to its pivot axis by pivotal detent lever 60. Each rod 56 defines a unique angular orientation of its respective leg rest support 16 by the insertion thereof into the bifurcated tip 64 of the lever 60. Additional, intermediate, angular orientations are achieved by the insertion of the bifurcated tip 64 in the gaps between adjacent detent rods, each such gaps being greater in expanse, as measured perpendicularly between adjacent rods, as the width of the bifurcated tip 64, so that, for all angular orientations of the lever arm 60, ample space is provided for the tip to be inserted in a gap between adjacent rods. When the tip 64 is inserted into a gap, a forward edge surface thereof is forced against the rear surface 52' of the rigid plate 52, and held in position by the opposing rods on either side of the tip.

While it has been shown that two leg rest supports 16 are provided, each being independent of the other, it is also within the scope and purview of the invention to provide one such leg rest support of greater width than either of supports 16, so that both legs may rest upon one such support.

The seat 10 may also be provided with an additional buttressing element, shown in FIG. 10. This element is a rigid bar having an upper end pivotally secured to the rear underside of the track element 36 via a pin 72 and plate 74. The lower end of the rigid bar is provided with a roller-follower similar to a caster, which rides in an arcuate C-shaped channel 76 formed in the upper surface 54' of the support base 54. The roller-follower is restrained in the channel 76, and moves along the arcuate path thereof as the track element 36 rotates about pivot shaft 52. The radius of curvature of the channel 76 is the same as the circular radius of the path of movement of the underside of the track element to which the upper end of the rigid bar is pivotally connected when it is rotated about the pivot shaft 52. Typically, the arcuate channel 76 extends for 90 degrees on the surface 54', since the track element usually is not rotated more than that; however, channel 76 may be provided so as to extend a greater circumferential distance. The arcuate channel 76 preferably originates directly under the non-rotated, within-the-vehicle position of the track elements 38, and is spanned along the surface 54' in a direction away from the door of the vehicle, which in FIG. 1 would be into the plane of the page and arcing toward the stops 32'. The rigid, bar-buttresssing element 70 serves to provide additional integral support, especially when the seat proper is projected out of the vehicle, and a person is seated thereon. Such seating causes additional load-bearing requirements for the seat 10, since the seat proper 12, 14 is offset from the pivot shaft 52 and the central portion of the track 32, which offsetting generates moments about the pivot shaft, necessitating countermeasures realized by the rigid bar 70. Regardless of the angular orientation of the seat proper, the rigid bar provides the counterbalance necessary, since the rigid bar moves along with the rotation of the rear portion of the track element 36.

The control of the motors 24, 40 and 58 are preferably remotely-controlled by a transmitter unit shown schematically in FIG. 7A. The transmitter unit 80 is made up of six transmitting resonance-circuits TU1 through TU6. Units TU1 and TU2 control the motor 24, units TU3 and TU4 control the motor 40, while the units TU5 and TU6 control the motor 58. The structure of each resonance-circuit is not shown, it being understood that such is well-known in the art and standard. Each transmitting unit controls the operation of its respective reversible motor, so as to cause rotation thereof in one direction. Each motor has associated therewith a pair of receiving units indicated by the letters RU in FIG. 7B, and a pair of switching elements, indicated in FIG. 7B by letters SW. Each receiving unit is tuned for reception of the signal from its matching transmitting unit, so that receiving unit RU1 is set to respond to the transmitting unit TU1, and so forth. Upon the generation of the transmitting signal from any of the transmitting units, the corresponding receiving unit is activated to close its respective associated switching element, in the conventional fashion, to thus energize the respective motor via its connection with the vehicular battery. Though not shown, it is clear that each motor is connected to the vehicular battery via the pair of respective switches associated therewith which switches are normally open.

The transmitting units are encased so as to provide a convenient, hand-held package, such as 80 shown in FIG. 8. Such package may be supported on an appropriately formed cut-out in the arm rest 82 of the door adjacent to the seat of the invention, when the seat is ready to be powered, or may be stored in storage space 84 formed in the arm rest itself, as shown in FIG. 8. The storage space 84 preferably has an access opening 84' at the top surface thereof. The transmitter 80 is powered by a battery in the conventional manner, and allows for the control of each of the three motors of the invention by the seated handicapped or elderly person, by the driver of the vehicle, or by a passenger, whether inside the vehicle or outside thereof.

While a specific embodiment of the invention has been shown and described, it is to be understood that numerous changes and modifications thereof may be made without departing from the scope, spirit, and intent of the invention as set out in the appended claims.

What is claimed is:

1. A vehicular seat for handicapped and elderly persons, comprising, in combination:
   a seat proper having a bottom portion;
   first means operatively connected to said seat proper for mounting said seat proper for rotation about a first vertical pivot axis; said first means comprising a carriage mounted for reciprocal movement, and also comprising a pivot means upstanding from said carriage rotatably mounting said seat proper for rotation about said first vertical pivot axis;
   second means mounting said carriage for reciprocal movement, said second means comprising a horizontal track means; said carriage of said first means having means for guided movement along said said track means so as to define a horizontally-shiftable first vertical pivot axis;

third means for rotatably mounting said track means of said second means for rotation about a second vertical pivot axis; said third means comprising an upstanding pivot shaft defining said second vertical pivot axis, said pivot means being laterally movable relative to said pivot shaft to thereby define an adjustable, eccentric rotation of said seat proper relative to said upstanding pivot shaft, so that said seat proper may be angularly adjusted to the position of the open door of the vehicle, and also be adjusted so that, depending upon its position along said track means, its position relative to the opening of the door of the vehicle may be changed and preset;

said upstanding pivot shaft and said pivot means being substantially in axial co-linear alignment for normal uses of said seat proper when said seat proper is positioned within the vehicle and not projecting outwardly of the vehicular door, so that said pivot shaft and pivot post rotate as one unit without eccentric rotation of said seat proper;

means for selectively and fixedly positioning said seat proper in a desired relative rotational orientation with respect to said track means, whereby said seat proper may be rotated relative to said carriage means and said track means to orient said seat proper at any desired angular position with respect to said track means; and means for mounting the lower portion of said pivot shaft to the frame of the vehicle to which said seat proper is to be mounted.

2. The vehicular seat for handicapped and elderly persons according to claim 1, wherein said track means comprises a track in which said means for guided movement of said carriage reciprocate, said track having a first end and a second end spaced from said first end; said first end of said track comprising a first upstanding abutment stop means and said second end of said track comprising a second upstanding abutment stop means; said abutment stop means defining the horizontal limits of conjoint movement of said carriage and said seat proper; said track comprising a pair of telescopingly-arranged track elements, one said track element be mounted for sliding movement within the other of said track elements, so that said one track element may be alternatively extended and retracted in order to change the effective length of said track, whereby said track can be accommodated in any type and size of vehicle, so that the rotation of the track and, therefore, the seat, can be accomplished more efficiently and safely.

3. The vehicular seat according to claim 2, wherein said track further comprises means for fixedly securing said track elements at a desired plurality of relative positions; each of said track elements comprising an upper roof portion for preventing said means for guided movement from escaping therefrom, so that once said seat proper is extended along said track to its outward-most position, the bending moments created by a person sitting on said seat proper are counteracted by said upper roof portions of said track elements in contact with said means for guided movement.

4. The vehicular seat according to claim 1, wherein said means for fixedly positioning said seat proper in a desired relative rotational orientation comprises an annular plate fixedly mounted to the underside of said seat proper, said annular plate having a plurality of circumferentially spaced holes, said annular plate having a diameter greater than the width of said seat proper so that at least two diametrically-opposed portions of said annular plate project beyond the side-edge faces of said seat proper, so that a person sitting on the seat can gain access to the holes therein; said carriage comprising an upper portion having a similar series of circumferentially-spaced holes that are alignable with said circumferentially-spaced holes of said annular plate; and a plurality of detent pins for insertion through the mutually-aligned circumferentially-spaced holes of said annular plate and said upper portion of said carriage, so that said seat may be locked in a desired angular orientation relative to said carriage.

5. The vehicular seat according to claim 1, further comprising at least one pivotal leg rest having a first end pivotally attached to the front portion of said seat proper and a second end from said first end; and means for selectively positioning said leg rest at a plurality of desired angular orientations relative to said front portion of said seat proper and comprising a pivotal lever arm having a first end pivoted to the underside of said seat proper rearwardly of said front portion to which said leg rest is pivoted, and a second end remote from said first end having freedom for pivotal movement thereby; said second end of said pivotal lever arm comprising a bifurcated end; said leg rest comprising a plurality of rear, parallel detent bars spaced from the rear surface of said leg rest a distance allowing said second end of said pivotal lever arm to abut thereagainst when said second end of said pivotal lever arm is inserted between two adjacent ones of said detent rods, so that when said second end of said pivotal lever arm abuts against said rear surface of said leg rest, the leg rest and said pivotal lever arm are locked in place without any relative pivotal movement therebetween being possible; said bifurcated second end of said pivotal lever arm also allowing for engagement in a desired one of said plurality of detent rods, so as to allow additional intermediate positions of said leg rest relative to said front portion of said seat proper, an upper portion of said bifurcated second end of said pivotal lever arm being in contact with the lower portion of a detent rod above the detent rod to which it is secured when said bifurcated end is engaged with a desired one of said detent rods, the contact therebetween preventing any relative movement between said leg rest and said pivotal lever arm to thus lock in place said leg rest at a desired one of the positions relative to said front portion of said seat proper, without any additional locking structure necessary to keep said leg rest at a desired one of said chosen angular positions relative to said front portion of said seat proper.

6. The vehicular seat according to claim 5, wherein said leg rest comprises a pair of rearwardly extending, oppositely-disposed side plates between which the opposite ends of each said detent rod is mounted in spaced relationship from said rear surface of said leg rest; each of said side plate extending rearwardly and away from a respective side edge surface of said rear surface of said leg rest.

7. The vehicular seat according to claim 1, further comprising buttressing means for buttressing said seat proper when it is extended outwardly of the ajar vehicular door and a person is seated thereupon, said buttressing means comprising a rigid bar having a first end pivotally connected to a rear underside surface portion of said seat proper, and a second end having a cam follower; said means for mounting said pivot shaft to the frame of said vehicle comprising an arcuate channel in which said cam follower moves to limit the movement thereof and to confine the movement thereof to a desired path; said arcuate channel having a first end adjacent a first side edge surface of said seat proper and a second end arcuately spaced from said first end toward an oppositely disposed second side edge surface of said seat proper, so that as said seat proper is rotated, said cam follower moves in said arcuate channel to thereby absorb any bending moments created on said seat proper by a person being seated thereon.

8. A vehicular seat for handicapped and elderly persons to aid in their entry into the vehicle and egress therefrom, comprising:

a seat upon which a person may sit;

a carriage pivotally mounting the underside of said seat for rotation in a first horizontal plane, said carriage comprising a vertical pivot pin for rotatably mounting said seat for said rotation in said horizontal plane;

track means mounting said carriage for reciprocal movement in a second horizontal plane, such that said carriage may be moved back and forth;

upstanding pivot means for pivotally mounting said track means for conjoint rotation with said carriage about a vertical pivot axis, such that said seat may be rotated in a first horizontal plane singly, may be reciprocated back and forth along said track means, and may be rotated conjointly with said track means about said vertical pivot axis, such that said seat may be given any degree of freedom of movement which may combined with any other degree of freedom of movement thereof;

means for driving said carriage along said track means in reciprocal fashion;

said vertical pivot axis and said pivot pin normally being in coaxial alignment during normal positioning of said seat in the vehicle thereof, said pivot pin being horizontally-shiftable within a horizontal plane relative to said vertical axis to thereby allow eccentric revolution of said pivot pin about said vertical axis;

said track means comprising a first track element, and a second track element telescopingly mounted within said first track element for selected and fixed extension therefrom, and means for selectively and fixedly positioning said second track element relative to said first track element for a selected, fixed extension therefrom, to thereby vary the stroke of reciprocating travel of said carriage;

said first track element having a first stop member at one end thereof for limiting the movement of said carriage in one direction, and said second track element having a second stop member at one end thereof for limiting the reciprocal travel of said carriage in the other direction thereof;

said carriage comprising means for movement in said first and second track elements, whereby said seat may be adjusted to the size of an opening of the vehicle; and to the angle of the ajar door thereof, whereby said seat may be projected outwardly of said vehicle at an angle most propitious to the seating of an elderly or handicapped person thereon.

9. A vehicular seat for elderly and handicapped persons to allow easy seating in a vehicle, comprising:

seat means upon which a person may sit;

carriage means mounting said seat means for reciprocal movement in a horizontal plane, said carriage comprising pivot means for pivotally rotating said seat means about a vertical axis;

said seat means comprising at least one leg rest portion having a first end pivotally connected to a front portion of said seat means and a second end remote from said first end, and means for adjustably positioning said at least one leg rest portion at a plurality of relative angular positions;

said leg rest portion comprising a pair of side walls projecting from opposite side edges thereof to limit lateral movement of a leg resting thereupon, and a pair of rearwardly extending side wall surfaces, said leg rest portion further comprising a plurality of parallel detent rods mounted between said rearwardly-extending side wall surfaces;

said means for adjustably positioning said leg rest portion in a plurality of adjustable positions comprising a first lever arm pivotally connected to an underside surface portion of said seat means, and a second end remote from said first end thereof and comprising a C-shaped cut-out for reception therein of one of said detent rods;

said leg rest portion comprising a substantially flat plate upon which the leg rests, said plate comprising a front surface and a rear surface, said plurality of detent rods lying rearwardly of said rear surface of said plate; said plurality of detent rods being spaced an equal distance from said rear surface of said plate, the spacing between adjacent ones of said detent rods allowing for the insertion therethrough of said second, C-shaped end of said lever arm such that said second end of said lever arm abuts against said rear surface of said flat plate for intermediate positions of said leg rest portion, whereby a plurality of adjustable and fixed positions of said leg rest portion are achievable by the insertion of said C-shaped second end of said lever arm into one of said plurality of detent rods or between adjacent ones of said plurality of detent rods;

said C-shaped opening of said second end of said lever arm having at least one edge surface thereof that abuts against said rear surface of said plate when said C-shaped cut-out is inserted into one of said plurality of detent rods to thereby prevent the downward pivotal movement of said leg rest portion thereby, said second end of said lever arm when positioned between adjacent ones of said detent rods preventing also the downward rotation of said leg rest portion by the contact of said second end against said rear surface of said plate and against an adjacent upper one of said detent rods.

* * * * *